(12) United States Patent
Wu et al.

(10) Patent No.: US 6,254,122 B1
(45) Date of Patent: Jul. 3, 2001

(54) REINFORCED TRIM COVER FOR A VEHICLE SEAT ASSEMBLY WITH A TEAR LINE FOR AIRBAG DEPLOYMENT

(75) Inventors: Wei-Pin Wu, Canton; Frank Wu, Novt; Walton H. Shurtleff, Brighton, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/018,834

(22) Filed: Feb. 4, 1998

(51) Int. Cl.$^7$ .................................................. B60R 21/22
(52) U.S. Cl. ...................................... 280/730.2; 280/728.3
(58) Field of Search .............................. 280/730.2, 730.1, 280/728.3, 728.1

(56) References Cited

U.S. PATENT DOCUMENTS

| | | |
|---|---|---|
| 5,217,244 | * 6/1993 | Bauer . |
| 5,222,760 | * 6/1993 | Rafferty . |
| 5,382,047 | * 1/1995 | Gajeski . |
| 5,498,030 | 3/1996 | Hill et al. . |
| 5,527,574 | * 6/1996 | Iannazzi et al. . |
| 5,533,748 | * 7/1996 | Wirt et al. . |
| 5,553,887 | 9/1996 | Karlow et al. . |
| 5,564,733 | * 10/1996 | Duenas et al. . |
| 5,630,615 | 5/1997 | Miesik . |
| 5,639,111 | 6/1997 | Spencer et al. . |
| 5,651,582 | 7/1997 | Nakano . |
| 5,678,853 | 10/1997 | Maly . |
| 5,744,776 | 4/1998 | Bauer . |
| 5,762,363 | 6/1998 | Brown et al. . |
| 5,816,610 | * 10/1998 | Higashiura et al. . |
| 5,927,749 | 7/1999 | Homier et al. . |
| 5,967,603 | 10/1999 | Genders et al. . |
| 5,988,674 | * 11/1999 | Kimura et al. . |
| 6,003,938 | * 12/1999 | Lachat et al. . |

FOREIGN PATENT DOCUMENTS

| | | |
|---|---|---|
| 2185296 | 11/1996 | (CA) . |
| 0782944A1 | 7/1997 | (EP) . |
| 2293355A | 3/1996 | (GB) . |
| 3-112747 | * 5/1991 | (JP) . |
| 8258660 | 10/1996 | (JP) . |
| 971212 | 3/1997 | (JP) . |

* cited by examiner

Primary Examiner—Eric Culbreth
(74) Attorney, Agent, or Firm—Foley & Lardner

(57) ABSTRACT

A vehicle seat having an inflatable airbag with the trim cover overlying the airbag being reinforced in the region adjacent to the airbag and having a weakened zone formed by cutting the reinforcement to create a tear line for deployment of the airbag through the trim cover. The reinforcement reduces stretching of the trim cover during deployment of the airbag at locations surrounding the tear line such that the trim cover ruptures along the tear line to produce a predictable airbag deployment.

21 Claims, 3 Drawing Sheets

REINFORCED TRIM COVER FOR A VEHICLE SEAT ASSEMBLY WITH A TEAR LINE FOR AIRBAG DEPLOYMENT

BACKGROUND AND SUMMARY OF THE INVENTION

The present invention relates generally to a vehicle seat having an inflatable airbag contained therein and in particular to a trim cover for the seat having a reinforced region adjacent the airbag with a weakened zone forming a tear line for deployment of the airbag through the trim cover.

Generally, seat mounted airbag systems fall into two different categories known as class A and class B. A class A airbag deploys from a visible, discreet door in the seat. A class B airbag is disposed beneath the seat trim cover and is designed to deploy through the trim cover without the use of a visible door. An advantage of a class A airbag with the visible door is that deployment of the airbag through the door uses technology that has already been developed for front crash airbags mounted in steering wheels and instrument panels. The technology for providing consistent and repeatable deployment of the airbag through such a door is well developed. A class B airbag is often preferred for styling considerations. A disadvantage of a class A airbag is that the airbag location in the seat is generally limited to the side or rear of the seat so that the visible door is not part of the seating surface engaged by a seat occupant. If it is desired for an airbag to deploy through a front corner of the seat back, such as the bolster area, it may not be possible to use a class A airbag since the door may interfere with the seating surface of the seat. Rather, class B airbag must be used in which the airbag is underneath the seat trim cover and typically covered by a foam pad so that it does not adversely impact the seat comfort. However, with a class B airbag, there are considerably more variables involved with providing consistent airbag deployment and in meeting the desired airbag in-position timing.

The seat trim cover provides numerous variables effecting airbag deployment. The trim cover type, such as cloth, vinyl, leather, etc., and combinations of these various types all behave differently and have different tensile and tear strength. In addition, different materials of the same types such as different woven fabrics have different tensile strengths, tear strengths, weave nap direction, etc. which can effect the manner in which an airbag deploys through the trim cover if the airbag deploys by rupturing the trim cover. Other variables introduced by the trim cover include the strength of the trim cover scrim layer or backing, and the strength of the thin layer of foam that is typically laminated to the underside of the trim cover outer layer.

Wear of the trim cover material over time and damage to the trim cover by cutting, puncturing, cigarette burns, etc., also introduces variables in airbag deployment. For example, a cut in the trim cover at a location other than the intended deployment location can cause the trim cover to rupture at the wrong location, resulting in the airbag being out of position or taking more time to reach its position.

One approach to reduce some of the variables caused when deploying an airbag through the trim cover is to deploy the airbag through a seam in the cover rather than rupturing the cover material itself. While seam deployment reduces variability, it limits seat styling by dictating where the seam is located.

It is an object of the present invention to provide a trim cover for a vehicle seat with an airbag in which the airbag deploys by rupturing the trim cover by reducing the variability in trim cover rupture to achieve a consistent and predictable airbag deployment.

To accomplish the above, the trim cover employs a reinforcement in the region of the trim cover overlying the inflatable airbag. The reinforced region has a weakened zone forming a tear line for directing deployment of the airbag through a predetermined location in the trim cover. By reinforcing the trim cover in the region overlying the airbag and surrounding the weakened zone, the trim cover is shielded or protected from the inflation forces except for the weakened zone forming the tear line. This tear line thus becomes the "weak link" in the trim cover, resulting in the trim cover rupturing at the tear seam as oppose to other nearby locations.

In a preferred embodiment of the invention, the trim cover is reinforced by the provision of a layer of sheet material to the inner side of the trim cover forming a reinforcing panel. The reinforcing panel has a higher strength and is less stretchable than the outer surface layer of the trim cover. Preferably, the reinforcing panel is a low strength material compared to the outer layer. A known material for this application is the same material used in the airbag which naturally must withstand the airbag inflation forces without failure. Other high strength sheet materials may be used as well. Preferably, the reinforcing panel is laminated to the trim cover material. The reinforcing panel is cut along a line which may be straight or of irregular shape to provide the weakened zone in the trim cover.

In a typical construction, the trim cover material has an outer surface layer and a thin layer of foam. The reinforcing panel layer is positioned on the inner surface of the foam layer. The tear line is preferably formed by cutting both the reinforcing panel and through the foam layer. One method of manufacturing the trim cover is to first laminate the outer layer, foam and reinforcing panel to one another and then laser cut the reinforcing panel and the foam layer along the tear line. Depending on the particular application, the laser cut may partially penetrate into outer layer material itself. Alternatively, the cut may only partially penetrate through the foam or may only penetrate through the reinforcing layer. In another alternative, the laser cut may penetrate partially into the outer layer, weakening it as well.

In the preferred embodiment, the layers of the trim cover are laminated together and then laser cut to form the weakened zone. It is possible to precut the various layers and then join them together with the cut lines aligned with one another. As an alternative, the reinforcing panel may be joined to the other layers only at the perimeter of the reinforcing panel.

The function of the reinforcing layer is to strengthen and reduce the stretch of the trim cover in the region surrounding the tear line. A high strength and low stretchable material such as airbag fabric will perform this function. However, the same function may be achieved with a reinforcing material that is merely less stretchable than the outer layer material. Such a material, when cut to form the weakened zone and laminated to the outer layer, will result in the outer layer stretching more at the tear line than the surrounding area. Thus the outer layer will fail at the tear line when the airbag deploys. Furthermore, the reinforcing layer may not need to be high strength material. As long as the combination of the reinforcing layer and the outer layer is stronger than the outer layer by itself, the combined layers with the weakened zone in the reinforcing layer will result in failure at the tear line created by the weakened zone in the reinforcing layer.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
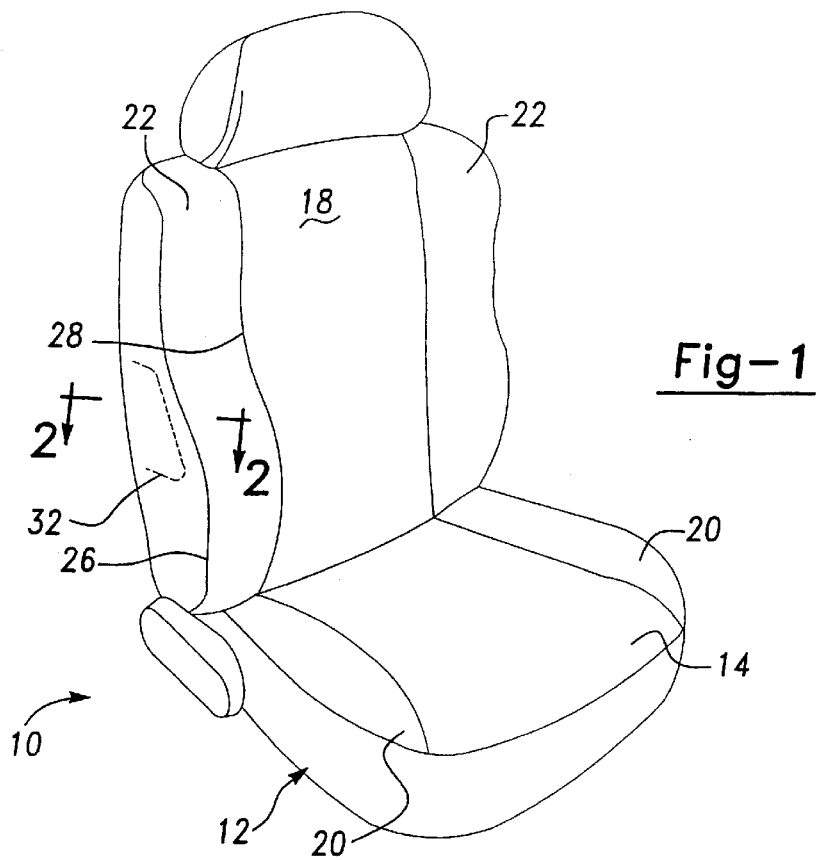
FIG. 1 is a perspective view of a vehicle seat assembly of the present invention with a trim cover having a reinforced region over an inflatable airbag with a weakened zone in the reinforcing panel forming a tear line.

A seat assembly according to the present invention is shown in FIG. 1 and designated generally at 10. The seat assembly 10 includes a lower, generally horizontal seat bottom 12 forming a generally horizontal seating surface 14. A seat back 16 extends generally upwardly at the rear end of the seat bottom 12. The seat back forms an upright seating surface 18 against which a seat occupant rests their torso. The seat bottom has left and right side bolsters 20 while the seat back has left and right side bolster 22. The seat assembly can include an inflatable airbag at various locations such as the side bolsters of either the side bottom or seat back for side impact protection or in the seat back to protect a rear passenger. The invention will be described below in connection with a side airbag mounted to the seat back in the right bolster 22. The invention can be utilized at any location in the trim cover desired for an airbag to deploy therethrough.

The seat back 16 includes a trim cover 24 which is made of a plurality of pieces of sheet material joined together at seams such as the seams 26 and 28. The number and location of the seams is determined partially by functional considerations to form a tight, form fitting trim cover and also by stylistic considerations.

The trim cover piece 30 which covers all or a portion of the right side bolster 22 of the seat back is formed with a reinforcing panel as described below and which has a weakened zone forming a tear line shown by the broken line 32 in FIG. 1. As described below, it will be seen that the tear line 32 is not visible on the surface of the vehicle seat.

Figure 2:
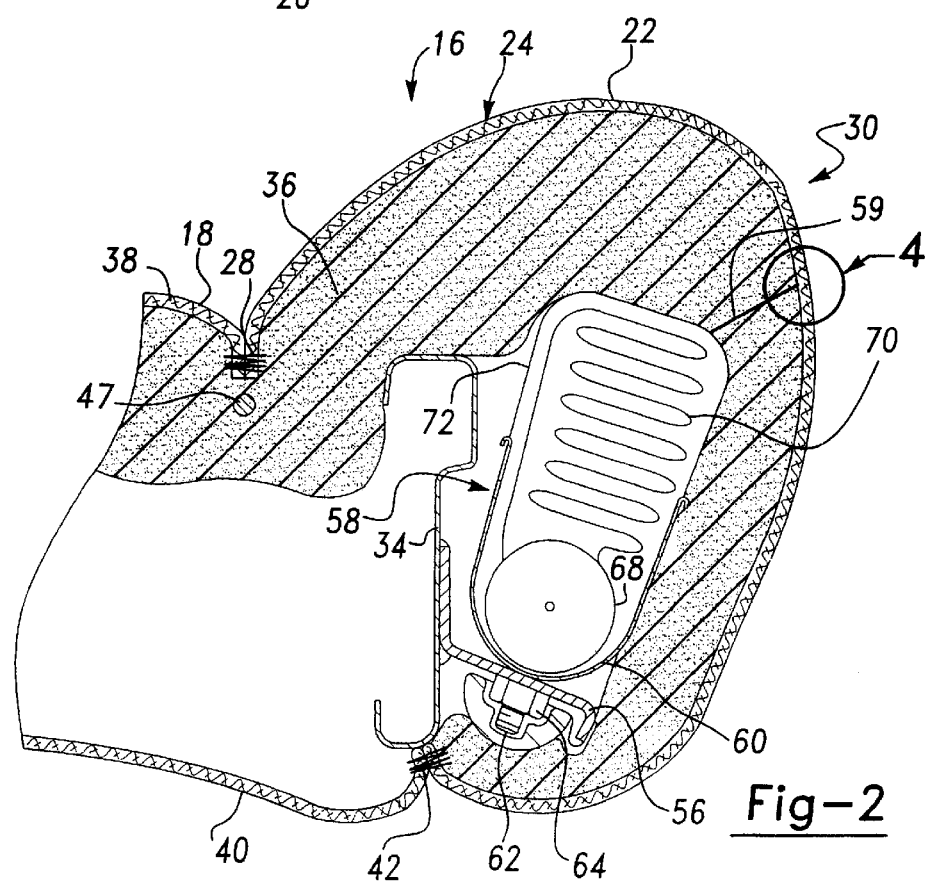
FIG. 2 is a cross-sectional view through the side bolster of the seat shown in FIG. 1 as seen substantially the line 2—2 in FIG. 1.

With reference to FIG. 2, the construction of the seat back is shown in greater detail. The seat back includes a frame 34 that provides the structural support for the seat back. The frame supports a pad 36 such as a urethane foam pad, rubberized hair pad, etc. The pad is, in turn, covered by the trim cover 24. The portion of the trim cover covering the right bolster 22 is the trim cover piece 30. The trim cover piece 30 is joined to a trim cover piece 38 in the front center of the seat back at the seam 28. The trim cover piece 30 extends around the bolster to the rear of the seat back where it is joined to another piece of trim cover 40 at the seam 42.

A mounting bracket 56 attached to the frame 34 is used to mount a side airbag module 58. The airbag module includes a housing 60 with one or more threaded studs 62 that pass through apertures (not shown) in the bracket 56 and are attached thereto by nuts 64 to mount the module to the bracket 56. The module 58 further includes a folded airbag 70 and an inflator 68 that provides gas for inflating the airbag. A thin sheet 72 covers the folded airbag and holds the airbag in place during shipping and handling of the module. The sheet 72 is designed to rupture during deployment of the airbag without affecting the airbag deployment. The illustrated airbag module 58 is only exemplary of many modules that could be used with the invention. The specific structure and components of the module illustrated do not form the present invention other than the provision an inflatable airbag in the seat assembly. The pad 36 may or may not completely cover the airbag. The pad may have a slot 59 forming a passage for the airbag through the pad. Depending on the location of the airbag module and the intended deployment location in the trim cover, it may be possible and preferred to position the airbag directly behind the trim cover without any pad covering the airbag.

Figure 3:
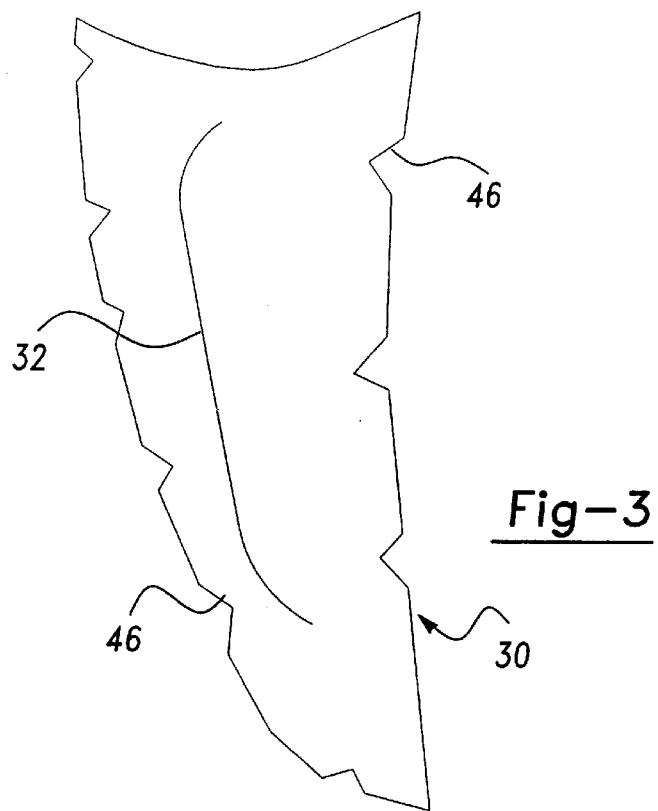
FIG. 3 is a side view of the seat cover trim panel covering the bolster and overlying the airbag.

FIG. 3 illustrates the trim cover piece 30 showing the tear line 32. The perimeter of the trim cover has a plurality of notches 46 which are used in aligning the trim cover piece 30 with adjacent pieces of the trim cover for joining the trim cover pieces together. In addition, these notches can be used for alignment of the trim cover piece 30 within a fixture used during cutting to form the tear line 32.

Figure 4:
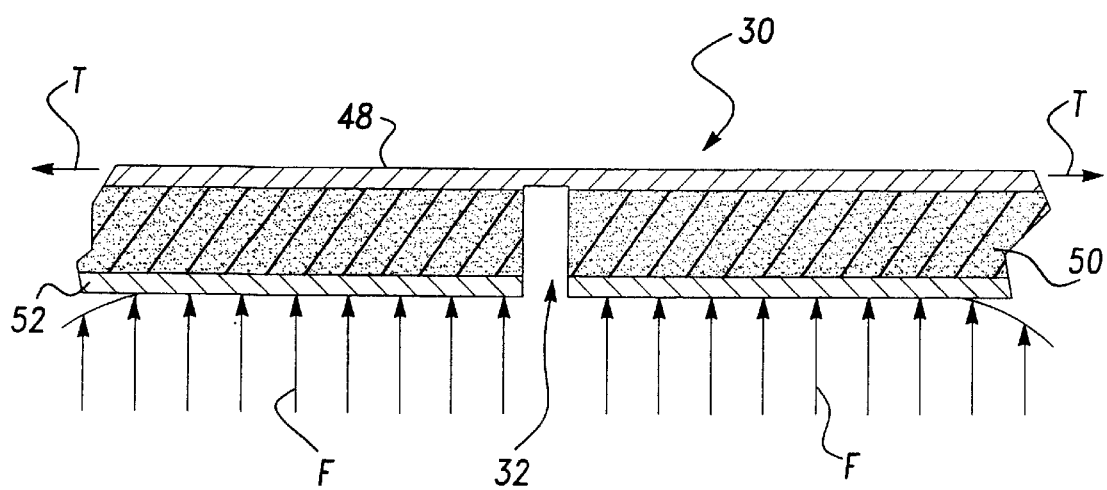
FIG. 4 is an enlarged sectional view of the trim cover panel from the circle 4 in FIG. 2 illustrating the multiple layer structure of the time cover piece overlaying the airbag and the weakened zone therein.

The trim cover piece 30 is shown in greater detail in FIG. 4. In a preferred embodiment, it is constructed of three layers. The first is the outer layer 48. This may be a woven fabric, leather, synthetic sheet materials such as vinyl, or other material used to form the exterior surface of the seat assembly. Joined to the underside of the outer layer 48 is a thin foam layer 50. The foam layer 50 provides a smooth contour to the trim cover at the transition zones and where the trim cover is wrapped around a curved surface. A reinforcing panel 52 is applied to the opposite surface of the foam layer. The reinforcing panel 52 is made of a flexible sheet material to conform to the contours of the trim cover. The panel is less stretchable than the outer layer 48 and may be a low stretchable material. The reinforcing panel may also be a high strength material to withstand the inflation forces of the airbag 70 without rupture of the reinforcing panel. A preferred material for the reinforcing panel is the same material used to manufacture the airbag such as a nylon material. However, lower strength materials may be used if the combined outer and reinforcing layers are stronger than the outer layer itself.

The trim cover piece 30 is formed with a weakened zoned to create a tear line 32. The weakened zone is formed by a cut in the reinforcing panel 52 at the intended deployment location of the airbag. As shown in FIG. 4, the tear line 32 also extends through the foam layer 50 and partially into the outer layer 48. Penetration of 10 or 20 percent into the outer layer is believed to have no or little impact on the wear of the outer layer. The depth of the cut may vary from one application to another. At one end of the range of depths, the cut only penetrates the reinforcing panel 52. At the other end of the range it penetrates through all but the outer layer and partially through the outer layer.

Figure 5:
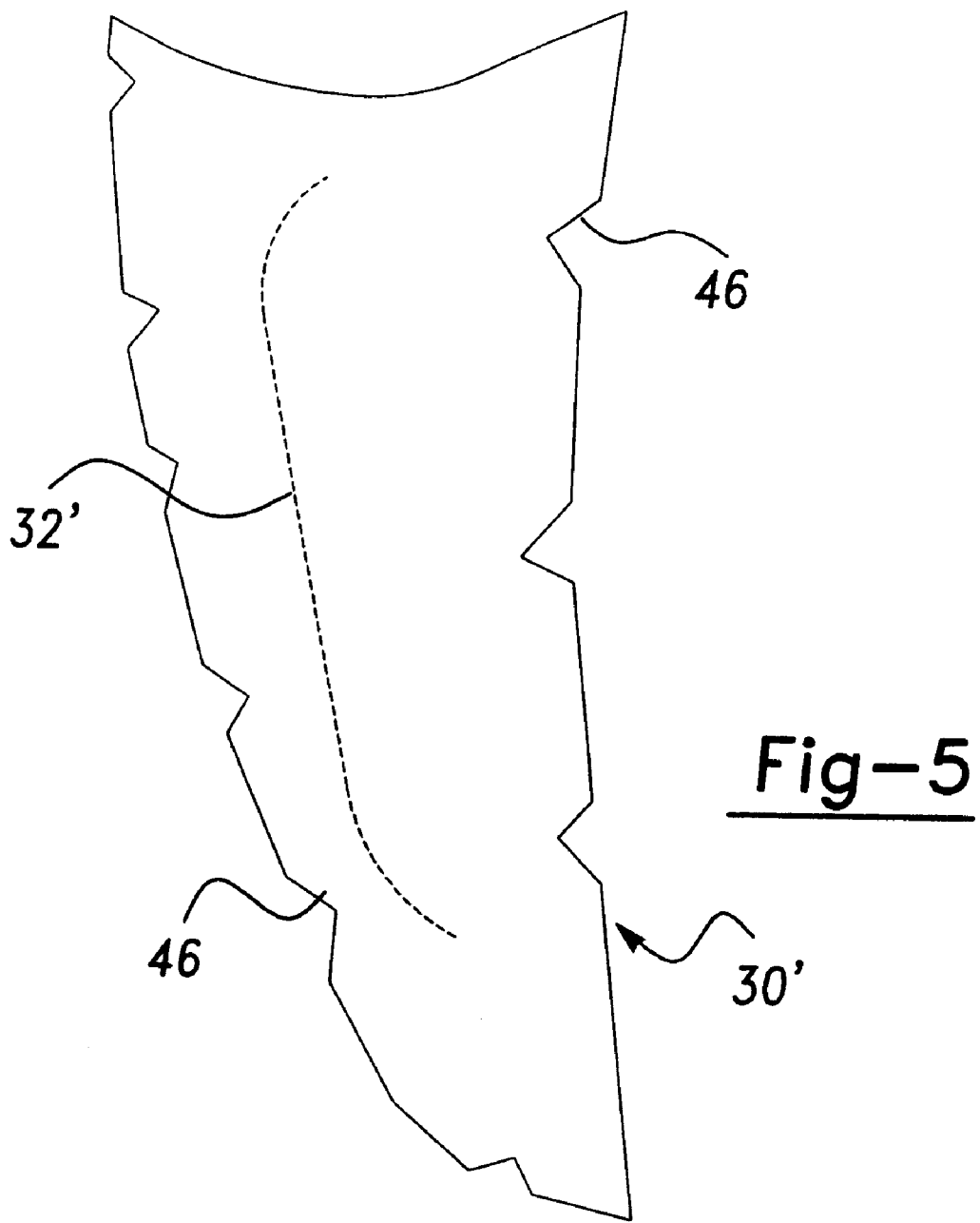
FIG. 5 is a side view like FIG. 3 of an alternative embodiment of the invention in which the weakened zone is formed by a series of short cuts in the inner layer as opposed to a continuous cut.

The cut in the reinforcing layer may be a continuous cut as shown in FIG. 3 or it may be a series of short, spaced apart cuts along a line 32' as shown in FIG. 5. The partial penetration into the outer layer may also be a continuous cut or short, spaced cuts as well. Alternatively, the reinforcing panel may have a continuous cut while the outer layer has a series of short, spaced apart cuts.

As the airbag inflates, it rapidly increases in volume and pushes outward on the trim cover. As shown by the arrows F in FIG. 4, the outward push of a trim cover is somewhat uniform in the area surrounding the tear line 32. Since the edges of the trim cover piece 30 are joined to the seat, the outward force F will cause tension in the trim cover piece shown by the arrows T. This will cause stretching of the trim cover until the trim cover ruptures enabling the airbag to penetrate therethrough. The presence of the reinforcing layer 52, which is less stretchable than the outer layer, prevents, or at least, reduces stretch in the outer layer 48 except in the region of the outer layer overlying the tear line 32. This area will receive the maximum degree of stretching, resulting in rupture or tearing of the trim cover at the line 32.

In a preferred embodiment of the invention, the trim cover piece 30 is first formed by laminating the reinforcing panel 52 to the foam and outer layers. The tear line 32 is subsequently formed by laser cutting. The trim cover piece 30 is placed in a fixture to hold it in place whereby the laser cut can be controlled as to its location and depth. It is also possible to manufacture the trim cover piece 30 by first cutting the reinforcing panel 52 and the foam 50 and then laminating the layers together with the cut lines aligned with one another. Pre-cutting each layer may facilitate the cutting by allowing other cutting methods to be used. It does add complexity to the process since proper alignment of the cut lines must be maintained when the layers are joined together.

The foam layer 50 is optional. The reinforcing layer 52 can be placed directly against the outer layer 48. Alternatively, the reinforcing layer 52 may be placed between the outer layer 48 and the foam layer 50. Other layers may be included in the trim cover piece 30 as desired. The reinforcing layer is referred to as an "inner reinforcing layer" in the claims to designate that the reinforcing layer is inside the outer layer of the trim cover. There may be other layers yet inside of the reinforcing layer and between the outer layer and the reinforcing layer. While in a preferred embodiment the multiple layers of the trim cover are laminated to one another, it is possible to form the trim cover by joining the reinforcing panel to the outer layer only at the perimeter of the reinforcing panel, such as at the seams 28 and 42 as shown in FIG. 2. With such a construction, the reinforcing panel would still function to reduce the stretching of the outer layer at locations other than the tear line 32. Preferably the reinforcing panel extends between two of the attachments of the trim cover to the seat. The piece 30 is attached to the seat wire 47 at the seam 28 and to the frame 34 at seam 42.

The reinforcing panel has been shown as being the same size as the outer layer of the piece 30 of the trim cover. It may be possible to use a reinforcing panel which is smaller, such as a strap, covering the region overlaying the airbag and possibly extending to the adjacent trim cover tie down locations.

The invention provides for a predictable and repeatable deployment of an airbag through the seat trim cover. This is accomplished by providing a reinforcing panel in the trim cover in a region overlying the airbag module. A weakened zone is formed in the reinforcing panel to form a tear line through the trim cover. The reinforcing panel is made out of a material that is less stretchable than the outer layer. As a result, when the trim cover is loaded in tension from a deploying airbag, the region of the outer layer overlying the weakened zone, in the reinforcing panel, will stretch more than the areas surrounding the weakened zone. As a result, failure of the outer layer of the trim cover will occur at the tear line. The reinforcing panel, when joined to the outer layer of the trim cover, must have a strength greater than the outer layer itself such that the outer layer will fail at the tear line when the airbag deploys.

It is to be understood that the invention is not limited to the exact construction illustrated and described above, but that various changes and modifications may be made without departing from the spirit and scope of the invention as defined in the following claims.

What is claimed is:

1. A trim cover for a vehicle seat assembly having an inflatable airbag at least partially surrounded by a pad, the trim cover forming an exterior surface of the seat assembly, cooperating with the pad to substantially envelop the inflatable airbag, and comprising:

multiple pieces of flexible sheet material joined to one another along edges thereof to form the trim cover forming the exterior surface of the seat assembly;

one piece of the multiple pieces having a flexible outer layer and a flexible inner reinforcing layer, the inner reinforcing layer being connected at one or more locations to the outer layer, the one piece being located in a region of the trim cover overlying the inflatable airbag; and a weakened zone in the inner reinforcing layer of the one piece forming a tear line at which the one piece fails from tensile stress when subjected to airbag inflation forces caused by the inflatable airbag and concentrated by the pad and the trim cover;

wherein the one piece further includes an intermediate layer whereby the one piece is a multiple layer structure, the inner reinforcing layer of a material being less stretchable than the outer layer, the inner reinforcing layer having a cut extending through all but the outer layer of the multiple layer structure to form the weakened zone.

2. The trim cover of claim 1 wherein the reinforcing layer is laminated to the intermediate layer of the multiple layer structure over substantially an entire surface of the reinforcing layer.

3. The trim cover of claim 1 wherein the inner reinforcing layer is joined to one of said outer layer and said intermediate layer of the multiple layer structure along a perimeter of the reinforcing layer.

4. The trim cover of claim 3 wherein the inner reinforcing layer is joined to one of said outer layer and said intermediate layer at seams in the trim cover.

5. The trim cover of claim 1 wherein the cut in the inner reinforcing layer is a continuous cut along a predetermined path.

6. The trim cover of claim 1 wherein the cut in the inner reinforcing layer is a series of short, spaced apart cuts along a predetermined path.

7. The trim cover of claims 1 wherein the reinforcing layer is made of a material used to manufacture the airbag.

8. The trim cover of claim 1 wherein the inner reinforcing layer is attached to one or more locations of the vehicle seat assembly.

9. The trim cover of claim 1 wherein the cut is a laser cut to form the weakened zone.

10. The trim cover of claim 1 wherein the cut further extends to partially penetrate the outer layer.

11. The trim cover of claim 10 wherein the cut into the outer layer is a series of short, spaced apart cuts into the outer layer along a predetermined path.

12. A trim cover for a vehicle seat assembly having an inflatable airbag at least partially surrounded by a pad, the trim cover forming an exterior surface of the seat assembly, cooperating with the pad to substantially envelop the inflatable airbag, and comprising:

multiple pieces of flexible sheet material joined to one another along edges thereof to form the trim cover forming the exterior surface of the seat assembly;

one piece of the multiple pieces having a flexible outer layer and a flexible inner reinforcing layer, the inner reinforcing layer being connected at one or more locations to the outer layer, the one piece being located in a region of the trim cover overlying the inflatable airbag; and a weakened zone in the inner reinforcing layer of the one piece forming a tear line at which the one piece fails from tensile stress when subjected to airbag inflation forces caused by the inflatable airbag and concentrated by the pad and the trim cover;

wherein the one piece is a multiple layer structure having an outer layer, an inner reinforcing layer of a material which is less stretchable than the outer layer and a foam layer between the inner and outer layers with a cut extending through the reinforcing layer to form the weakened zone;

wherein the cut extends through all layers of the multiple layer structure but the outer layer.

13. A trim cover for a vehicle seat assembly having an inflatable airbag at least partially surrounded by a pad, the trim cover forming an exterior surface of the seat assembly, cooperating with the pad to substantially envelop the inflatable airbag, and comprising:

multiple pieces of flexible sheet material joined to one another along edges thereof to form the trim cover forming the exterior surface of the seat assembly;

one piece of the multiple pieces having a flexible outer layer with a continuous exterior surface and a flexible inner reinforcing layer, the inner reinforcing layer being connected at one or more locations to the outer layer, the one piece being located in a region of the trim cover overlying the inflatable airbag; and a weakened zone in the inner reinforcing layer of the one piece forming a tear line at which the one piece fails from tensile stress when subjected to airbag inflation forces caused by the inflatable airbag and concentrated by the pad and the trim cover;

wherein the one piece is a multiple layer structure having an outer layer, an inner reinforcing layer of a material which is less stretchable than the outer layer and a foam layer between the inner and outer layers with a cut extending through the reinforcing layer to form the weakened zone;

wherein the cut extends completely through all layers of the multiple layer structure with the outer layer and the cut extends partially through the outer layer.

14. The trim cover of claim 13 wherein the partial penetration of the cut into the outer layer is a series of short, spaced apart cuts into the outer layer along a predetermined path.

15. A method of making a trim cover for a vehicle seat assembly having an inflatable airbag at least partially surrounded by a pad, the trim cover forming an exterior surface of the seat assembly and cooperating with the pad to substantially envelop the inflatable airbag, the method comprising the steps of:

(a) cutting multiple pieces of a flexible sheet material;

(b) joining the pieces together along edges of the pieces to form a cover of a size and shape to fit over the vehicle seat assembly, one of the multiple pieces located in a region of the trim cover overlying the inflatable airbag having a multiple layer structure with an outer layer and a flexible inner reinforcing layer of a material which is less stretchable than the outer layer; and (c) forming a weakened zone in the inner reinforcing layer of the one piece to create a tear line at which the one piece fails from tensile stress when subjected to airbag inflation forces by cutting through the reinforcing layer at a predetermined airbag deployment location;

wherein step (c) is performed by cutting all but the outer layer of the multiple layer structure of the one piece to form the weakened zone.

16. The method of claim 15 wherein step (c) is performed by cutting all but the outer layer of the multiple layer structure of the one piece entirely through and by cutting the outer layer partially through to form the weakened zone.

17. The method of claim 15 wherein step (c) is performed by a laser.

18. The method of claim 15 wherein step (c) is performed after the inner reinforcing layer is joined to the outer layer.

19. The method of claim 15 wherein step (c) is performed before the inner reinforcing layer is joined to the outer layer.

20. The method of claim 15 further comprising the step of laminating the inner reinforcing layer to the outer layer to form the multiple layer structure of the one piece.

21. A method of making a trim cover for a vehicle seat assembly having an inflatable airbag at least partially surrounded by a pad, the trim cover forming an exterior surface of the seat assembly and cooperating with the pad to substantially envelop the inflatable airbag, the method comprising the steps of:

(a) cutting multiple pieces of a flexible sheet material;

(b) joining the pieces together along edges of the pieces to form a cover of a size and shape to fit over the vehicle seat assembly, one of the multiple pieces located in a region of the trim cover overlying the inflatable airbag having a multiple layer structure with an outer layer and a flexible inner reinforcing layer of a material which is less stretchable than the outer layer; and (c) forming a weakened zone in the inner reinforcing layer of the one piece to create a tear line at which the one piece fails from tensile stress when subjected to airbag inflation forces by cutting through the reinforcing layer at a predetermined airbag deployment location;

wherein step (c) is performed by cutting all but the outer layer of the multiple layer structure of the one piece entirely through and by cutting the outer layer partially through to form the weakened zone.

* * * * *

UNITED STATES PATENT AND TRADEMARK OFFICE
CERTIFICATE OF CORRECTION

PATENT NO.   : 6,254,122 B1                                           Page 1 of 1
DATED        : July 3, 2001
INVENTOR(S)  : Wei-Pin Wu, Frank Wu and Walton H. Shurtleff It is certified that error appears in the above-identified patent and that said Letters Patent is hereby corrected as shown below:

<u>Column 7,</u>
Line 56, delete "with" and insert -- except --.

Signed and Sealed this

Eleventh Day of March, 2003

JAMES E. ROGAN
*Director of the United States Patent and Trademark Office*